(12) United States Patent
Wang et al.

(10) Patent No.: US 12,111,288 B2
(45) Date of Patent: Oct. 8, 2024

(54) DEVICE AND METHOD FOR MEASURING SETTLEABILITY OF ACTIVATED SLUDGE IN-SITU

(71) Applicant: Nanjing University, Nanjing (CN)

(72) Inventors: Jinfeng Wang, Nanjing (CN); Deyuan Dong, Nanjing (CN); Haidong Hu, Nanjing (CN); Bing Wu, Nanjing (CN); Hongqiang Ren, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 266 days.

(21) Appl. No.: 17/732,574

(22) Filed: Apr. 29, 2022

(65) Prior Publication Data
US 2022/0349856 A1 Nov. 3, 2022

(30) Foreign Application Priority Data
Apr. 29, 2021 (CN) .......................... 202110471925.4

(51) Int. Cl.
*G01N 29/02* (2006.01)
*G01N 1/14* (2006.01)
*G01N 1/38* (2006.01)

(52) U.S. Cl.
CPC ............... *G01N 29/02* (2013.01); *G01N 1/14* (2013.01); *G01N 1/38* (2013.01); *G01N 2291/02416* (2013.01)

(58) Field of Classification Search
CPC ............ G01N 29/02; G01N 1/14; G01N 1/38; G01N 2291/02416; G01N 2291/0251; G01N 29/032; G01N 29/222; G01N 2291/02836; Y02W 10/10
See application file for complete search history.

(56) References Cited

U.S. PATENT DOCUMENTS

| 4,264,788 A | * | 4/1981 | Keidel | ............... G01F 23/2968 367/908 |
| 2005/0035059 A1 | * | 2/2005 | Zhang | ................... B01D 61/04 210/605 |
| 2019/0084858 A1 | * | 3/2019 | Huo | ........................ C02F 9/00 |

FOREIGN PATENT DOCUMENTS

JP 2011104510 A * 6/2011

* cited by examiner

*Primary Examiner* — Tarun Sinha
(74) *Attorney, Agent, or Firm* — MATTHIAS SCHOLL P.C.; Matthias Scholl

(57) ABSTRACT

A device for in-situ measuring settleability of activated sludge includes a sample chamber, an ultrasonic time domain reflectometer, a magnetic stirrer, an ultrasonic probe, a sample inlet, a sample outlet, and a stagnant zone. The sample chamber is configured to hold an activated sludge sample, and the ultrasonic time domain reflectometer is configured to measure the settling characteristics of the activated sludge. The stagnant zone is disposed in the sample chamber. The sample inlet and the sample outlet communicate with the sample chamber. The stagnant zone includes a top part, a sidewall, and a bottom part. The sample inlet is connected to the top part of the stagnant zone. The sample outlet is connected to the sidewall of the stagnant zone. The magnetic stirrer is disposed at the bottom part of the stagnant zone. The ultrasonic probe is disposed on the top part of the stagnant zone.

5 Claims, 7 Drawing Sheets

DEVICE AND METHOD FOR MEASURING SETTLEABILITY OF ACTIVATED SLUDGE IN-SITU

CROSS-REFERENCE TO RELATED APPLICATIONS

Pursuant to 35 U.S.C. § 119 and the Paris Convention Treaty, this application claims foreign priority to Chinese Patent Application No. 202110471925.4 filed Apr. 29, 2021, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to a device and a method for measuring the settleability of the activated sludge in-situ by using an ultrasonic time domain reflectometer.

The activated sludge process is widely used for treating sewage or industrial wastewaters using aeration and a biological floc composed of bacteria and protozoa. In the process, problems such as sludge bulking, floating, and foaming may occur. As a result, the effluent quality is not up to standard, and large quantities of chemicals are added to the sludge for further treatment. Most of the problems of activated sludge can be directly reflected in the settleability of activated sludge.

The common methods for measuring the sludge settleability include graduated cylinder method and weight subtraction method. The conventional methods monitor only the sludge passing through a probe. Because the activated sludge is heterogeneous, the measurement for the thickness of the settled sludge is unreliable. In addition, the process is time consuming and does not measure other sludge property parameters, such as mixed liquor suspended solids (MLSS) and sludge volume index (SVI).

SUMMARY

The disclosure provides a device for in-situ measuring settleability of activated sludge, the device comprising: a sample chamber, an ultrasonic time domain reflectometer, a magnetic stirrer, an ultrasonic probe, a sample inlet, a sample outlet, and a stagnant zone; the sample chamber is configured to hold an activated sludge sample, and the ultrasonic time domain reflectometer is configured to measure the settling characteristics of the activated sludge; the stagnant zone is disposed in the sample chamber; the sample inlet and the sample outlet communicate with the sample chamber; the stagnant zone comprises a top part, a sidewall, and a bottom part; the sample inlet is connected to the top part of the stagnant zone; the sample outlet is connected to the sidewall of the stagnant zone; the magnetic stirrer is disposed at the bottom part of the stagnant zone; the ultrasonic probe is disposed on the top part of the stagnant zone; and the ultrasonic time domain reflectometer is connected to the ultrasonic probe to transmit signals.

In a class of this embodiment, the ultrasonic time domain reflectometer is used for in-situ measurement of the sludge settleability; the stagnant zone is used to collect an activated sludge sample and has a height of 25-30 cm and a volume of 500 mL; the stagnant zone is surrounded by glass through which the activated sludge sample can be observed clearly; the magnetic stirrer is used to automatically stir the activated sludge sample and allow it to precipitate; and the magnetic stirrer runs at a speed of 50-100 rpm for 10-30 seconds.

In a class of this embodiment, the ultrasonic time domain reflectometer comprises an ultrasonic transmitter and an oscilloscope; the ultrasonic probe further comprises a signal input terminal and a signal output terminal; the ultrasonic transmitter comprises a signal output terminal connected to the signal input terminal of the ultrasonic probe; and the oscilloscope comprises a signal input terminal connected to the signal output terminal of the ultrasonic probe. The ultrasonic transmitter is used to control the ultrasonic probe to generate an ultrasonic signal; the oscilloscope is used to collect the ultrasonic signal; and a data signal is collected, stored, and displayed on a control system.

In a class of this embodiment, the device further comprises an exhaust pipe comprising a first end and a second end; the first end of the exhaust pipe communicates with the stagnant zone and the second end of the exhaust pipe is extended out of the sample chamber. Thus, the bubbles, if occurring in the stagnant zone, can be removed. Removing bubbles is to maintain a steady state inside the sample chamber, thus eliminating interference to the ultrasonic signal.

In a class of this embodiment, the device further comprises a peristaltic pump and a pipeline; the peristaltic pump is disposed in the sample chamber and used to clear the activated sludge sample; the pipeline is disposed between the sample outlet and the stagnant zone; and the peristaltic pump is disposed on the pipeline. The peristaltic pump works at 200-500 rpm and comprises a tube having a diameter of 0.1-0.5 cm.

In a class of this embodiment, the device further comprises a ball valve for controlling the flow velocity of the activated sludge sample at 10-30 mL/min.

The disclosure also provides a method for in-situ measuring settleability of activated sludge, the method comprising:

1) collecting an activated sludge sample in a target location using a constant flow peristaltic pump;
2) guiding the activated sludge sample from the sample inlet into the stagnant zone; starting the magnetic stirrer to mix the activated sludge sample where exhaust gas is produced; and removing the exhaust gas out of the stagnant zone through an exhaust pipe communicating with the stagnant zone;
3) stopping the magnetic stirrer; turning on the ultrasonic time domain reflectometer to control the ultrasonic probe to emit an ultrasonic signal to monitor the activated sludge sample in the stagnant zone for 30 minutes; collecting the ultrasonic signal by the oscilloscope and showing an ultrasonic waveform change diagram over time;
4) forming a sludge settling displacement curve according to the ultrasonic waveform change diagram;
5) obtaining a displacement value at $30_{th}$ minute according to the sludge settling displacement curve; and calculating a sludge volume index (SVI) according to a fitted equation; and
6) removing the activated sludge sample out of the stagnant zone through the peristaltic pump.

In a class of this embodiment, in 4), the sludge settling displacement curve is formed as follows: obtaining a maximum displacement value at a target peak of the ultrasonic waveform change diagram during each time period; taking a displacement value at 0 minute as a benchmark, calculating a difference between the maximum displacement value during each time period and the benchmark, and drawing the sludge settling displacement curve with time as abscissa and the difference as ordinate.

In a class of this embodiment, in 5), the fitted equation is formed by linear regression of SVI value and displacement value that are respectively derived from a weight subtraction method and an ultrasonic time domain detection; and the fitted equation is expressed as y=4.3x+254.3; where y is the sludge volume index, and x is the displacement at $30_{th}$ minute.

In a class of this embodiment, the ultrasonic transmitter is operated at a pulse repetition frequency of 10-20 Hz, a pulse resistance is 10-50Ω, a pulse voltage is 100-400 V, a gain is 50-60 dB, a high-pass filter is 0.03-0.1 MHz, and a low-pass filter is 1-3 MHz.

In a class of this embodiment, in 3), the oscilloscope collects the ultrasonic signal once every 2-60 seconds.

The working principle of the device is as follows: the ultrasonic time domain reflectometer monitors the change of the density and thickness of a dielectric layer at different time points during the sludge settling process, so as to determine the sludge settling displacement curve and the sludge characteristics within 30 minutes, which is faster than a traditional method consuming 4-5 hours.

The following advantages are associated with the device of the disclosure:
1. the device of the disclosure offers the advantages such as in-situ measurement, simple process, and indoor operations over the conventional sludge detection methods;
2. the device of the disclosure monitors the sludge settling characteristics by mathematically analyzing the data in the spectrum within 30 minutes, instead of by analyzing for 4-5 hours through the conventional sludge detection methods;
3. the device of the disclosure collects the sludge settling data every two seconds in unattended conditions to form a sludge settling displacement curve; while the conventional sludge detection methods obtain only final result data;
4. the same activated sludge sample can be measured multiple times by the device of the disclosure due to use of the magnetic stirrer, but only enough to be measured once by a conventional sludge detection method; and
5. the device of the disclosure comprises a peristaltic pump that pumps the activated sludge sample in or out of the device so as to quickly measure the settling characteristics of different activated sludge samples.

In the drawings, the following reference numbers are used: 1. Sample chamber; 2. Sample inlet; 3. Ultrasonic probe; 4. Exhaust pipe; 5. Sample outlet; 6. Peristaltic pump; 7. Stirrer; 8. Stagnant zone; 10. Ultrasonic time domain reflectometer; 11. Oscilloscope; and 12. Ultrasonic transmitter.

DETAILED DESCRIPTION OF THE DRAWINGS

DETAILED DESCRIPTION

Figure 1:
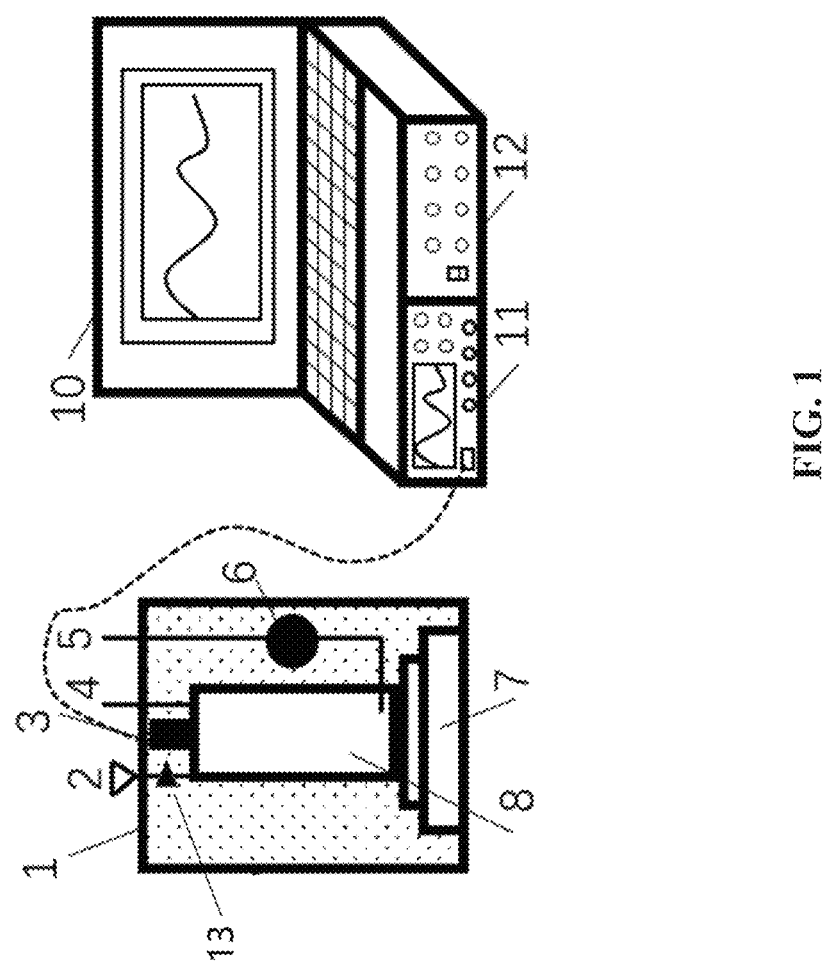
FIG. 1 is a perspective view of a device for in-situ measuring settleability of activated sludge according to one example of the disclosure.

Referring to FIG. 1, a device for in-situ measuring settling characteristics of activated sludge, the device comprising: a sample chamber 1, an ultrasonic time domain reflectometer 10, a sample inlet 2, a sample outlet 5, a magnetic stirrer 7, a stagnant zone 8, an ultrasonic probe 3, a ball valve 13, an exhaust pipe 4, and a peristaltic pump 6, and a pipeline; the sample chamber is configured to hold an activated sludge sample and comprises stainless steel for sound proofing; the stagnant zone 8 is disposed in the sample chamber and has a height of 25 cm and a volume of 500 mL; the stagnant zone is surrounded by glass; the ultrasonic time domain reflectometer is used to monitor the settling characteristics of the activated sludge; the sample inlet 2 and the sample outlet 5 are disposed outside of the sample chamber 1; the sample inlet 2 is in the shape of a funnel for collecting the activated sludge sample; the ball valve is disposed into the sample inlet 2 to control the flow velocity of the activated sludge sample at 10-30 mL/min; the exhaust pipe comprises a first end and a second end; the first end of the exhaust pipe communicates with the stagnant zone and the second end of the exhaust pipe is extended out of the sample chamber for gas removal; the stagnant zone comprises a top part, a sidewall, and a bottom part; the sample inlet is connected to the top part of the stagnant zone; the sample outlet is connected to the sidewall of the stagnant zone; the pipeline is disposed between the sample outlet and the stagnant zone; and the peristaltic pump is disposed on the pipeline; the magnetic stirrer is disposed at the bottom part of the stagnant zone and runs at a speed of 75 rpm for 25 seconds; and the ultrasonic probe is disposed on the top part of the stagnant zone. The ultrasonic time domain reflectometer 10 comprises an ultrasonic transmitter 12 and an oscilloscope 11; the ultrasonic probe comprises a signal input terminal and a signal output terminal; the ultrasonic transmitter comprises a signal output terminal connected to the signal input terminal of the ultrasonic probe; and the oscilloscope comprises a signal input terminal connected to the signal output terminal of the ultrasonic probe.

Example 1

A method for monitoring real-time settling characteristics of the sludge that bulks severely in an aerobic tank and cannot meet the Class 1 (A) municipal effluent quality requirements, the method comprising:

1. Activated Sludge Sampling

A target pool was divided into three independent areas; an activated sludge sample was collected at a depth of 0.5 m below the surface of sewage in each area; and three activated sludge samples were mixed together. The specific sampling process was detailed as follows: the activated sludge sample was collected by a peristaltic pump; the peristaltic pump comprised a pump tube provided with a sludge inlet; the sludge inlet was placed in a target location to extract 200 mL of activated sludge as a sample at a flow rate of 10 mL/min; the peristaltic pump was turned on to extract 2 L of sewage in the target location to clean the pump tube before next sludge sampling.

2. Sample Processing

Figure 2:
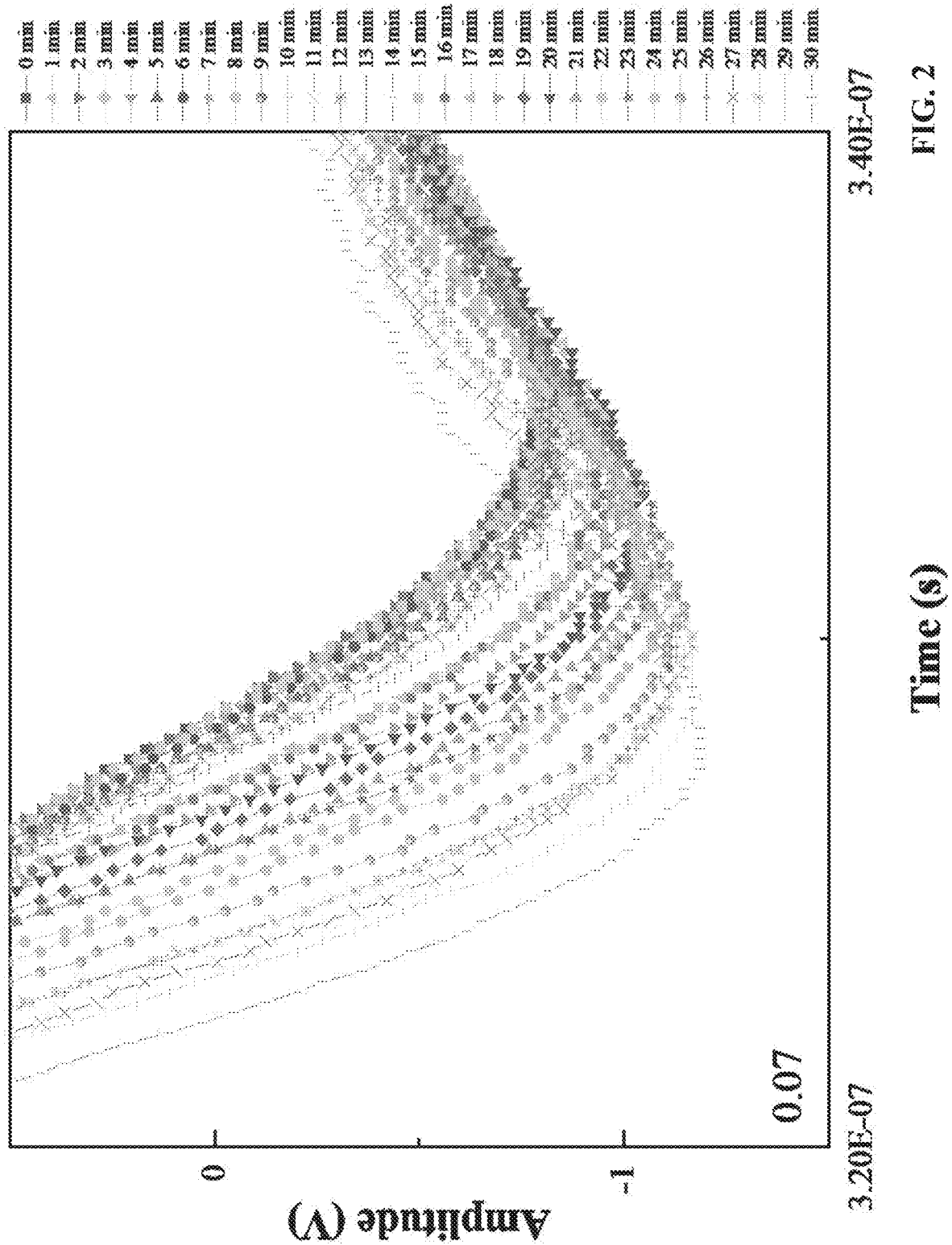
FIG. 2 is a schematic diagram of an ultrasonic wave detected in Example 1 of the disclosure.
Figure 3:
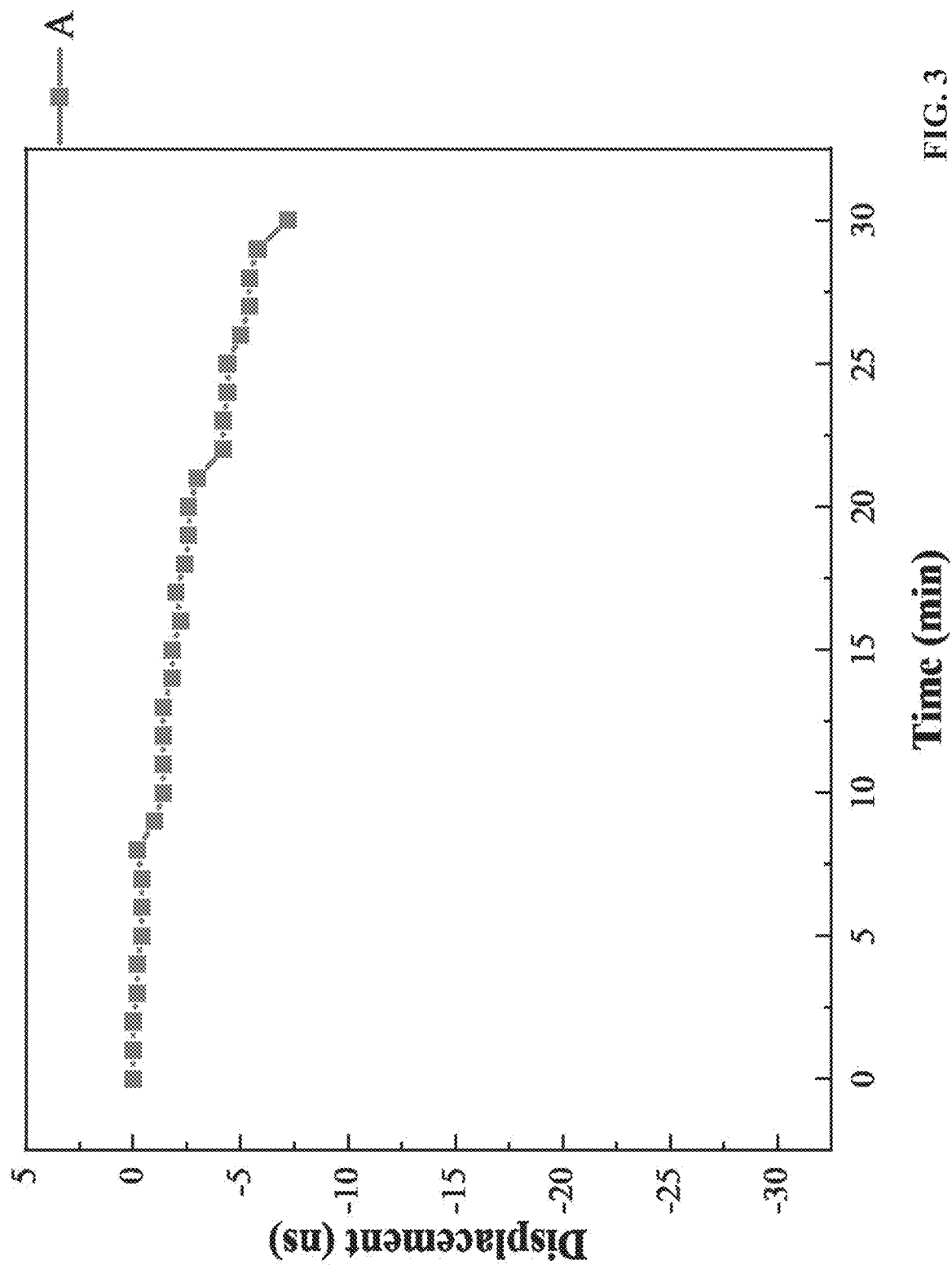
FIG. 3 is a graph showing a sludge settling displacement curve according to Example 1 of the disclosure.

As shown in FIG. 1, the device was placed on flat ground to extract the activated sludge sample via the sample inlet and to transport the activated sludge sample into the stagnant zone; the activated sludge sample was filled up to 2-5 cm below from the top part of the stagnant zone; the magnetic stirrer was turned on to mix the collected activated sludge samples; an exhaust gas flowed out of the stagnant zone through the exhaust pipe; then the stirring stopped, and the ultrasonic transmitter was turned on to control the ultrasonic probe to emit an ultrasonic signal to monitor the activated sludge sample in the stagnant zone for 30 minutes; the oscilloscope collected the ultrasonic signal once every 60 seconds and showed an ultrasonic waveform change diagram over time, as shown in FIG. 2; for the data shown in FIG. 2, the values of time increased from 0 to 30 minutes; the maximum displacement value at a target peak during each time period was obtained; and the displacement value at 0 minute was taken as a benchmark; a difference between the maximum displacement value during each time period and the benchmark was calculated; and a sludge settling displacement curve with time as abscissa and displacement as ordinate was drawn, as shown in FIG. 3. The displacement value increased with time; and the sludge settling curve shown a trend for analyzing the sludge settling rate (SVI) and pollutant removal performance; the ordinate corresponding to abscissa $30_{th}$ minute was −7 nanosecond (ns), which was used as index to measure the sludge volume index.

An equation was formed by linear regression of the displacement value and the SVI data that were respectively derived from the ultrasonic time domain detection and the weight subtraction method; and the equation fitting process comprises:
1. a sludge in an aerobic section of a sewage treatment plant was sampled and undergone an SVI measurement to obtain an SVI value; and 1) was repeated three times;
2. the same activated sludge sample was analyzed by the device of the disclosure: the activated sludge sample was placed into the sample chamber; the ultrasonic time domain reflectometer was turned on to monitor the activated sludge sample for 30 minutes, so that a displacement value was obtained; and 2) was repeated three times; and

| Sample | Sludge volume index (SVI) | Displacement |
| --- | --- | --- |
| 1 | −7.2 | 218.9 |
| 2 | −22 | 168.2 |
| 3 | −14.8 | 178.2 |
| 4 | −27.2 | 157.4 |
| 5 | −14.2 | 193.4 |
| 6 | −43.4 | 60.0 |
| 7 | −48.4 | 43.0 |

3. an equation was formed by linear regression of the SVI value and the displacement value and expressed as y=4.3x+254.3; where y was the sludge volume index, and x was the displacement at $30_{th}$ minute.

The ordinate value −7 ns was substituted into the equation to get an SVI value of 224.2 mL/g, which indicated that severe sludge bulking occurred in the samples of Example 1. The device of the disclosure determined the settling characteristics of the activated sludge within 30 minutes, which was faster than a conventional method consuming 4-5 hours.

Example 2

A method for monitoring real-time settling characteristics of the sludge that bulks severely in an aerobic tank and cannot meet the Class 1 (A) municipal effluent quality requirements, the method comprising:
1. Activated Sludge Sampling A target pool was divided into three independent areas; an activated sludge sample was collected at a depth of 0.5 m below the surface of sewage in each area; and three activated sludge samples were mixed together. The specific sampling process was detailed as follows: the activated sludge sample was collected by a peristaltic pump; the peristaltic pump comprised a pump tube provided with a sludge inlet; the sludge inlet was placed in a target location to extract 200 mL of activated sludge as a sample at a flow rate of 10 mL/min; the peristaltic pump was turned on to extract 2 L of sewage in the target location to clean the pump tube before next sludge sampling.

2. Sample Processing

Figure 4:
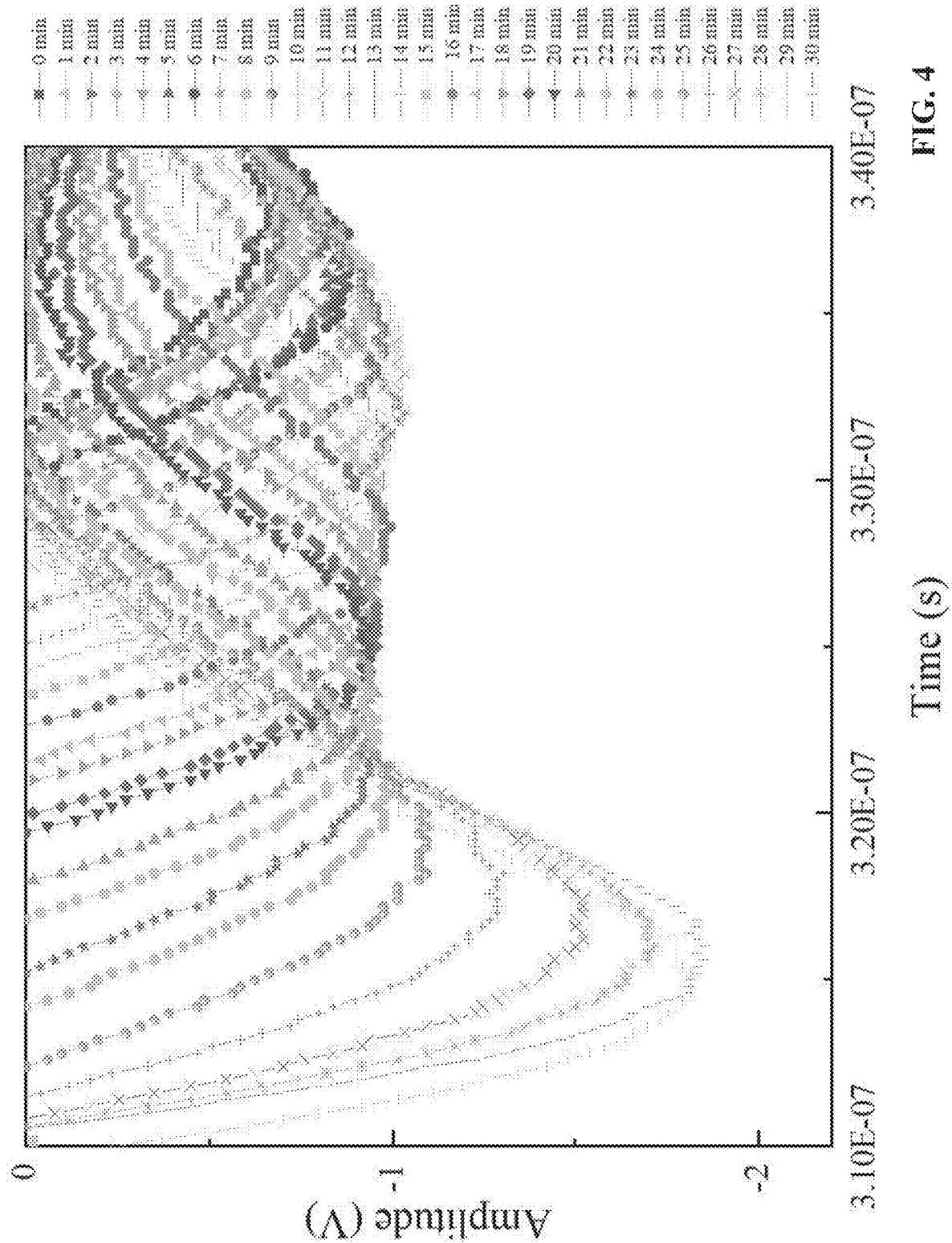
FIG. 4 is a schematic diagram of an ultrasonic wave detected in Example 2 of the disclosure.
Figure 5:
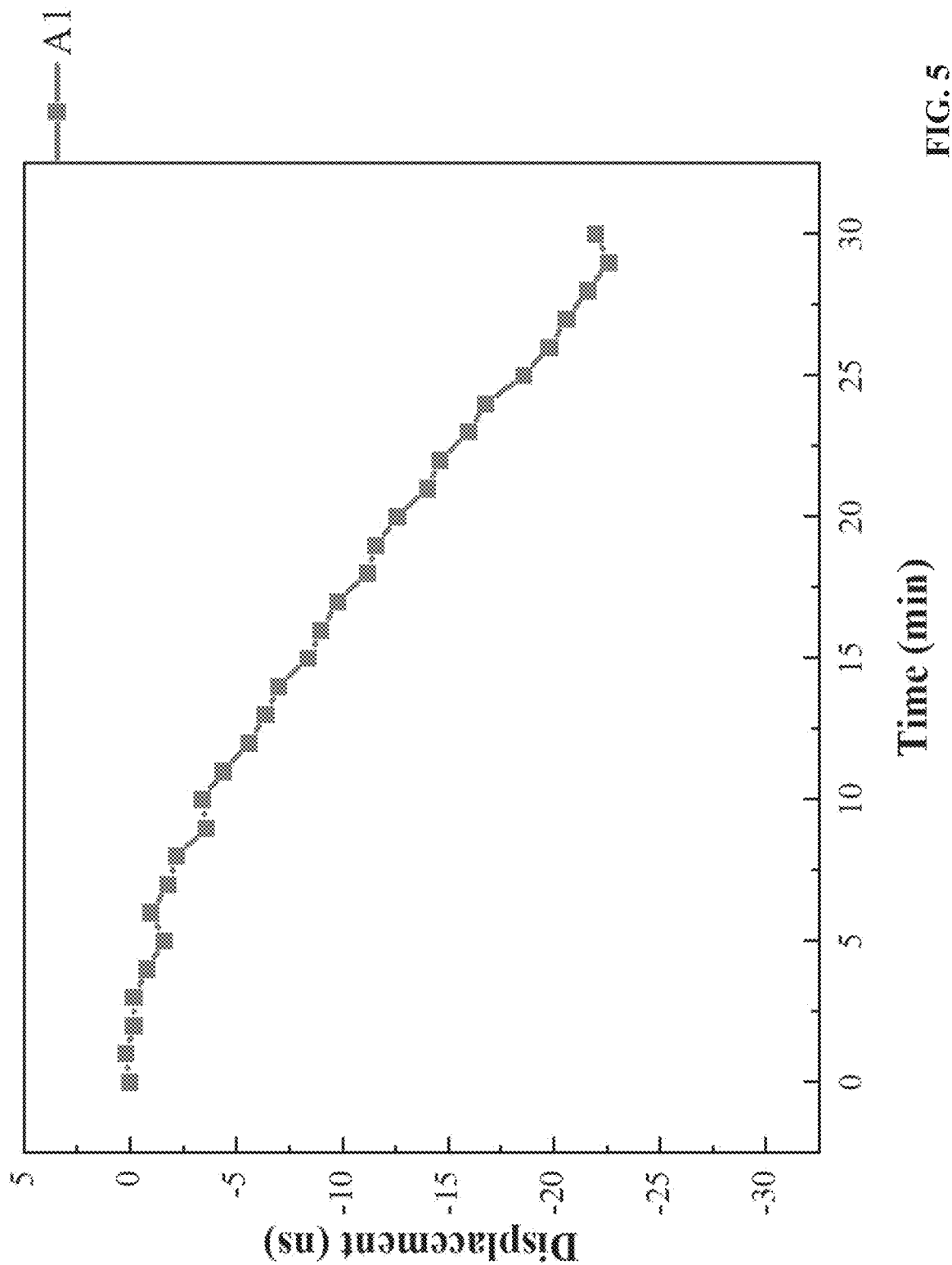
FIG. 5 is a graph showing a sludge settling displacement curve according to Example 2 of the disclosure.

As shown in FIG. 1, the device was placed on flat ground to extract the activated sludge sample via the sample inlet and to transport the activated sludge sample into the stagnant zone; the activated sludge sample was filled up to 2-5 cm below from the top part of the stagnant zone; the magnetic stirrer was turned on to mix the collected activated sludge samples; an exhaust gas flowed out of the stagnant zone through the exhaust pipe; then the stirring stopped, and the ultrasonic transmitter was turned on to control the ultrasonic probe to emit an ultrasonic signal to monitor the activated sludge sample in the stagnant zone for 30 minutes; the oscilloscope collected the ultrasonic signal once every 60 seconds and showed an ultrasonic waveform change diagram over time, as shown in FIG. 4. For the data shown in FIG. 4, the values of time increased from 0 to 30 minutes; the maximum displacement value at a target peak during each time period was obtained; and the displacement value at 0 minute was taken as a benchmark; a difference between the maximum displacement value during each time period and the benchmark was calculated; and a sludge settling displacement curve with time as abscissa and displacement as ordinate was drawn, as shown in FIG. 5. For the data shown in FIG. 5, the displacement value increased with time; the ordinate corresponding to abscissa $30_{th}$ minute was −22 ns, which was used as index to measure the sludge volume index and substituted into the fitted equation in Example 1 to get an SVI value of 159.7 mL/g, indicating that slight sludge bulking occurred in the samples.

Example 3

A method for monitoring real-time settling characteristics of the sludge that bulks severely in an aerobic tank and cannot meet the Class 1 (A) municipal effluent quality requirements, the method comprising:
1. Activated Sludge Sampling A target pool was divided into three independent areas; an activated sludge sample was collected at a depth of 0.5 m below the surface of sewage in each area; and three activated sludge samples were mixed together. The specific sampling process was detailed as follows: the activated sludge sample was collected by a peristaltic pump; the peristaltic pump comprised a pump tube provided with a sludge inlet; the sludge inlet was placed in a target location to extract 200 mL of activated sludge as a sample at a flow rate of 10 mL/min;

the peristaltic pump was turned on to extract 2 L of sewage in the target location to clean the pump tube before next sludge sampling.

2. Sample Processing

Figure 6:
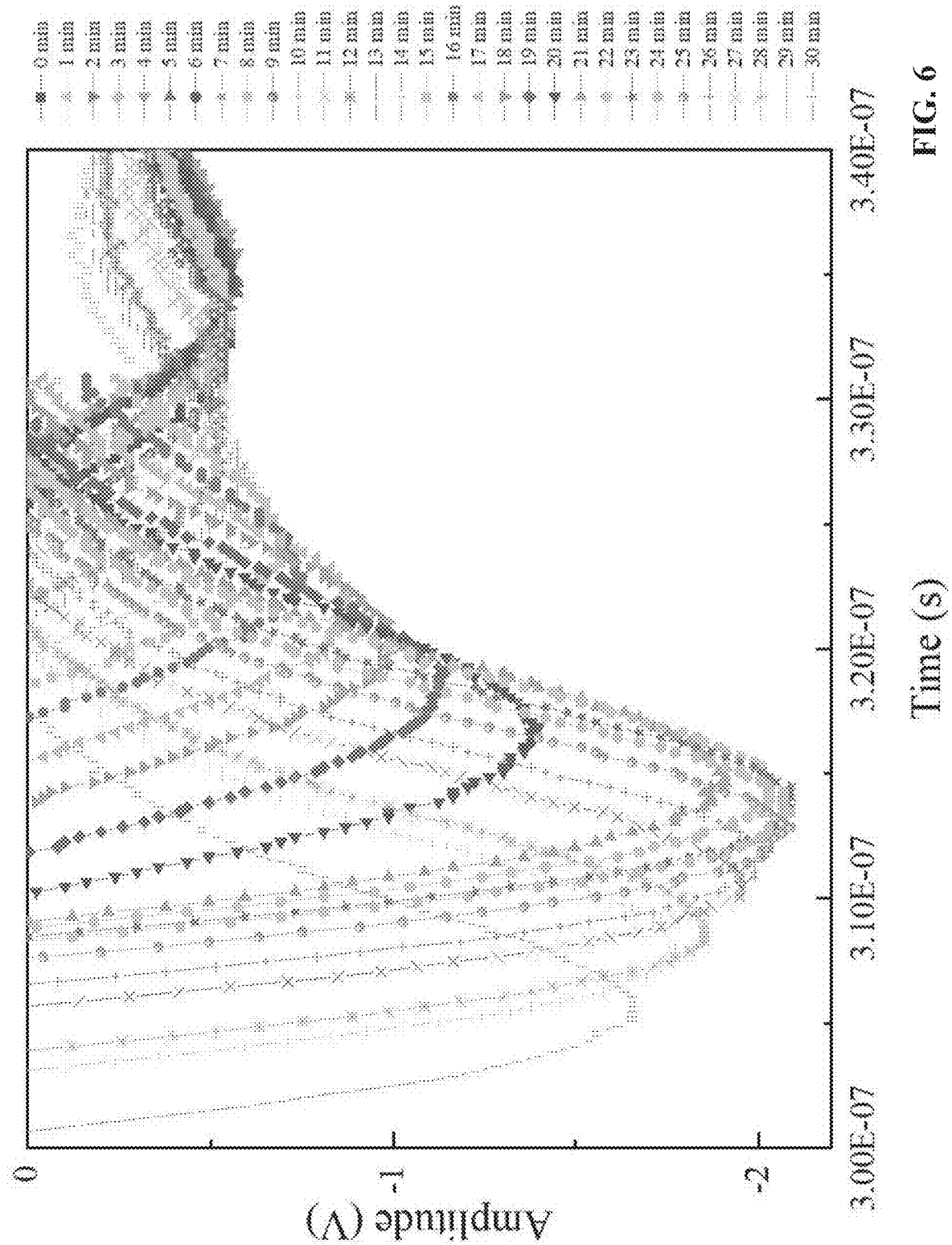
FIG. 6 is a schematic diagram of an ultrasonic wave detected in Example 3 of the disclosure.
Figure 7:
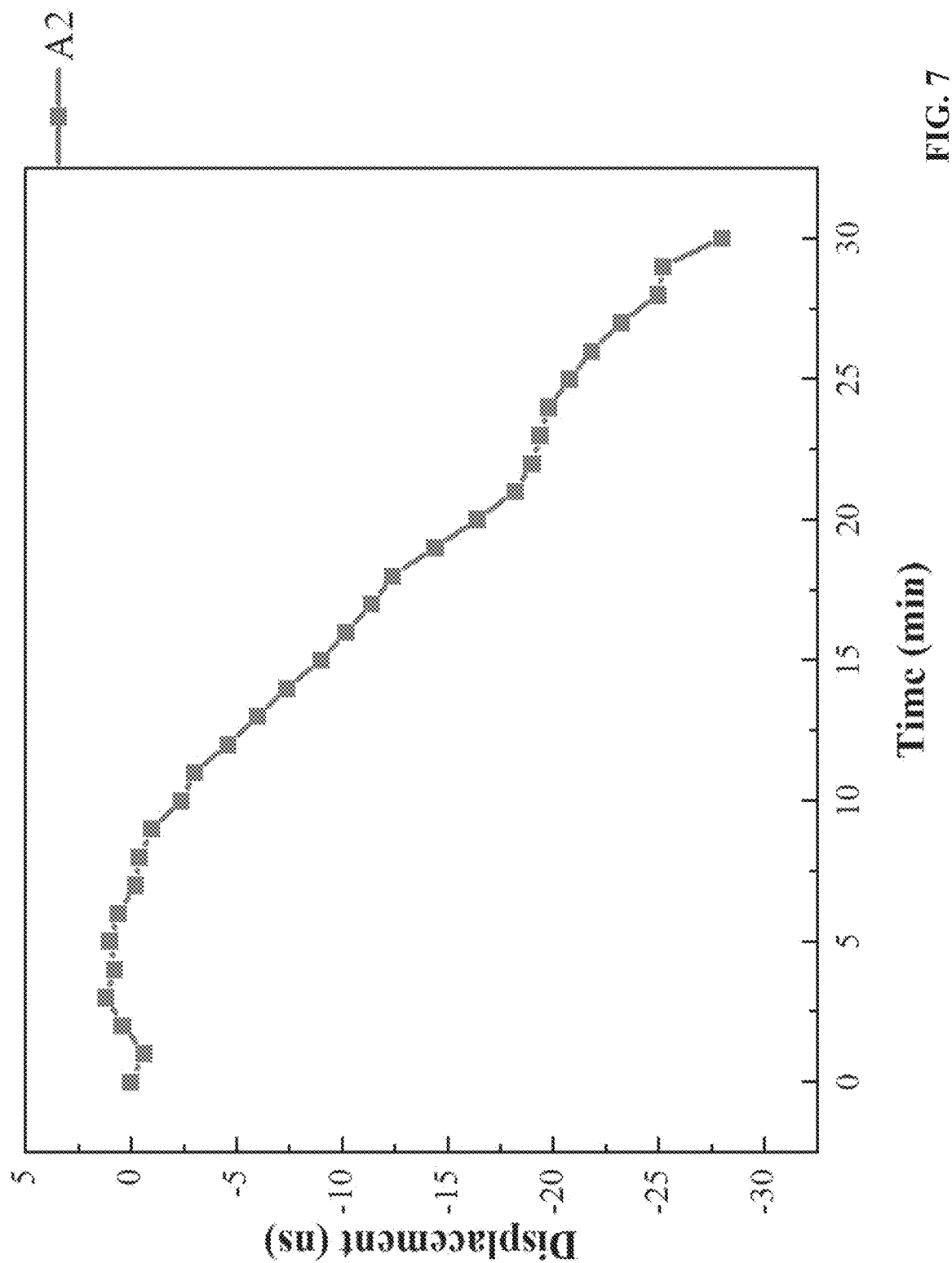
FIG. 7 is a graph showing a sludge settling displacement curve according to Example 3 of the disclosure.

As shown in FIG. 1, the device was placed on flat ground to extract the activated sludge sample via the sample inlet and to transport the activated sludge sample into the stagnant zone; the activated sludge sample was filled up to 2-5 cm below from the top part of the stagnant zone; the magnetic stirrer was turned on to mix the collected activated sludge samples; an exhaust gas flowed out of the stagnant zone through the exhaust pipe; then the stirring stopped, and the ultrasonic transmitter was turned on to control the ultrasonic probe to emit an ultrasonic signal to monitor the activated sludge sample in the stagnant zone for 30 minutes; the oscilloscope collected the ultrasonic signal once every 60 seconds and showed an ultrasonic waveform change diagram over time, as shown in FIG. 6. For the data shown in FIG. 6, the values of time increased from 0 to 30 minutes; the maximum displacement value at a target peak during each time period was obtained; and the displacement value at 0 minute was taken as a benchmark; a difference between the maximum displacement value during each time period and the benchmark was calculated; and a sludge settling displacement curve with time as abscissa and displacement as ordinate was drawn, as shown in FIG. 7. For the data shown in FIG. 7, the displacement value increased with time; the ordinate corresponding to abscissa $30_{th}$ minute was −28 ns, which was used as index to measure the sludge volume index and substituted into the fitted equation in Example 1 to get an SVI value of 133.9 mL/g, indicating that slight sludge bulking occurred in the samples.

It will be obvious to those skilled in the art that changes and modifications may be made, and therefore, the aim in the appended claims is to cover all such changes and modifications.

What is claimed is:

1. A method for in-situ measuring settleability of activated sludge using a device, the device comprising:
   1) a sample chamber comprising a stagnant zone;
   2) an ultrasonic time domain reflectometer;
   3) a magnetic stirrer;
   4) an ultrasonic probe;
   5) a sample inlet; and
   6) a sample outlet;

wherein:
   the sample chamber is configured to hold an activated sludge sample, and the ultrasonic time domain reflectometer is configured to measure settling characteristics of the activated sludge sample;
   the sample inlet and the sample outlet communicate with the sample chamber; the stagnant zone comprises a top part, a sidewall, and a bottom part;
   the sample inlet is connected to the top part of the stagnant zone; the sample outlet is connected to the sidewall of the stagnant zone; the magnetic stirrer is disposed at the bottom part of the stagnant zone; and
   the ultrasonic probe is disposed on the top part of the stagnant zone; and the ultrasonic time domain reflectometer is connected to the ultrasonic probe to transmit signals;

the method comprising:
   1) collecting an activated sludge sample in a target location using a constant flow peristaltic pump;
   2) guiding the activated sludge sample from the sample inlet into the stagnant zone; starting the magnetic stirrer to mix the activated sludge sample where exhaust gas is produced; and removing the exhaust gas out of the stagnant zone through an exhaust pipe communicating with the stagnant zone;
   3) stopping the magnetic stirrer; turning on the ultrasonic time domain reflectometer to control the ultrasonic probe to emit an ultrasonic signal to monitor the activated sludge sample in the stagnant zone for 30 minutes; collecting the ultrasonic signal by an oscilloscope of the ultrasonic time domain reflectometer, and showing an ultrasonic waveform change diagram over time;
   4) forming a sludge settling displacement curve according to the ultrasonic waveform change diagram;
   5) obtaining a displacement value at $30_{th}$ minute according to the sludge settling displacement curve; and calculating a sludge volume index (SVI) according to a fitted equation; and
   6) removing the activated sludge sample out of the stagnant zone through a peristaltic pump.

2. The method of claim 1, wherein in 4), the sludge settling displacement curve is formed as follows: obtaining a maximum displacement value at a target peak of the ultrasonic waveform change diagram during each time period; taking a displacement value at 0 minute as a benchmark, calculating a difference between the maximum displacement value during each time period and the benchmark, and drawing the sludge settling displacement curve with time as abscissa and the difference as ordinate.

3. The method of claim 1, wherein in 5), the fitted equation is formed by linear regression of SVI value and displacement value that are respectively derived from a weight subtraction method and an ultrasonic time domain detection; and the fitted equation is expressed as y=4.3x+254.3; where y is the sludge volume index, and x is the displacement at $30_{th}$ minute.

4. The method of claim 1, wherein the ultrasonic transmitter is operated at a pulse repetition frequency of 10-20 Hz, a pulse resistance is 10-50Ω, a pulse voltage is 100-400 V, a gain is 50-60 dB, a high-pass filter is 0.03-0.1 MHz, and a low-pass filter is 1-3 MHz.

5. The method of claim 1, wherein in 3), the oscilloscope collects the ultrasonic signal once every 2-60 seconds.

* * * * *